US012763684B2

(12) United States Patent
Vogiatzakis et al.

(10) Patent No.: US 12,763,684 B2
(45) Date of Patent: Oct. 13, 2026

(54) POWER CONVERSION SYSTEM FOR WIRELESS COMMUNICATION SYSTEMS

(71) Applicant: RAYCAP S.A., Maroussi (GR)

(72) Inventors: Charalampos Vogiatzakis, Chania (GR); Anestis Kolovos, Serres (GR); Stavros Georgiadis, Maroussi (GR); Theodoros Mouselinos, Maroussi (GR); George Vassilakis, Maroussi (GR); Michael C. Bloxham, Mead, WA (US); Zafiris Politis, St. Stefanos (GR)

(73) Assignee: RAYCAP S.A., Athens (GR)

( * ) Notice: Subject to any disclaimer, the term of this patent is extended or adjusted under 35 U.S.C. 154(b) by 892 days.

(21) Appl. No.: 18/175,250

(22) Filed: Feb. 27, 2023

(65) Prior Publication Data

US 2024/0297582 A1 Sep. 5, 2024

(51) Int. Cl.
*H02M 3/156* (2006.01)
*H02M 1/00* (2006.01)

(52) U.S. Cl.
CPC ........... *H02M 3/156* (2013.01); *H02M 1/007* (2021.05); *H02M 1/0074* (2021.05); *H02M 1/009* (2021.05)

(58) Field of Classification Search
CPC .... H02M 3/1582; H02M 3/156; H02M 3/157; H02M 3/158; H02M 3/1584; H02M 3/1586; H02M 3/285; H02M 3/33561; H02M 7/49; H02M 1/045; H02M 7/006; H02M 7/06; H02M 7/068; H02M 7/153; H02M 7/10; H02M 1/083; H02M 7/103;
(Continued)

(56) References Cited

U.S. PATENT DOCUMENTS 9,099,860 B2 8/2015 Martinez
9,448,576 B2 9/2016 Chamberlain
(Continued)

FOREIGN PATENT DOCUMENTS

WO 2022/182652 A1 9/2022

OTHER PUBLICATIONS

International Search Report and Written Opinion issued in PCT Application No. PCT/IB2023/000107 dated Jul. 12, 2023; 12 pages.
(Continued)

*Primary Examiner* — Jeffrey A Gblende
(74) *Attorney, Agent, or Firm* — Schwabe Williamson & Wyatt

(57) ABSTRACT

A power conversion system for a power communications system, the power conversion system coupled to a power supply to supply input power over a power cable to remote radio heads (RRHs). The power conversion system comprises an input that receives input power from the power supply, and an output coupled to the power cable. A control module is configured to monitor power information, the power information including an input voltage of the power input, a current measurement of the input power, and a resistance of the power cable. One or more DC-DC converters is coupled to the control module and configured to generate an output voltage at the output, the output voltage generated by adding to the input voltage, a supplemental voltage determined from the monitored power information to compensate for a voltage decrease on the power cable.

13 Claims, 7 Drawing Sheets

(58) Field of Classification Search

CPC .......... H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/0095; H02M 1/08; H02M 1/088; H02M 3/1588; H02M 7/5395; H02M 1/14; H02M 1/0043; H02M 1/0074; H02M 1/0077; H02M 1/0045; H02M 1/0006; H02J 3/46; H02J 3/38; G01R 27/00; G01R 27/02; G01R 27/08; G01R 27/16

See application file for complete search history.

(56) References Cited

U.S. PATENT DOCUMENTS

| | | | | |
|---|---|---|---|---|
| 9,728,983 | B2 * | 8/2017 | Lun Li | H02J 7/00 |
| 10,025,335 | B2 | 7/2018 | Chamberlain | |
| 10,128,685 | B2 | 11/2018 | Hanley | |
| 10,423,180 | B2 | 9/2019 | Chanberlain | |
| 10,782,720 | B2 | 9/2020 | Guerin | |
| 10,812,664 | B2 * | 10/2020 | Kostakis | G05F 1/465 |
| 10,830,803 | B2 * | 11/2020 | Winkler | G05F 1/465 |
| 10,912,025 | B2 | 2/2021 | Coleman | |
| 10,971,928 | B2 | 4/2021 | Warner | |
| 11,275,395 | B2 * | 3/2022 | Chamberlain | G05F 1/62 |
| 2017/0339799 | A1 * | 11/2017 | Su | H05K 7/1489 |
| 2018/0164355 | A1 | 6/2018 | Winkler | |
| 2018/0213091 | A1 | 7/2018 | Kostakis | |
| 2019/0377394 | A1 | 12/2019 | Klaba | |
| 2020/0213940 | A1 | 7/2020 | Gandhi | |
| 2021/0072779 | A1 * | 3/2021 | Guerin | G05F 1/62 |
| 2023/0273661 | A1 | 8/2023 | Kolovos et al. | |
| 2023/0276592 | A1 | 8/2023 | Vogiatzakis et al. | |

OTHER PUBLICATIONS

International Search Report and Written Opinion for PCT/IB2023/000087 dated Oct. 9, 2023; 11 pages.

* cited by examiner

POWER CONVERSION SYSTEM FOR WIRELESS COMMUNICATION SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to a power transmission system for wireless communication systems, and in particular to power conversion systems for a wireless communication systems.

BACKGROUND

In a split Radio Base Station (RBS) architecture, the typical RBS comprises a base band unit (BBU) and remote radio heads (RRH) connected by cabling. Power to the RRH is provided through copper cables from the base station to the top of the tower or roof top. This creates a conductive path, making the active equipment at the top and the base of the site vulnerable to damage by direct lightning strikes. Overvoltage protection (OVP) systems installed in front of both the BBU and the RRH must be able to withstand direct lightning currents to protect the sensitive equipment.

In some systems, there is a need for an intelligent and dynamic power transmission to the RRH units of a telecommunication site, particularly at the base of a cellular site to compensate for the voltage drop on DC power cables from the base site to the RRHs located on a tower.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Embodiments for a power conversion system for wireless communication systems are described. The following description is presented to enable one of ordinary skill in the art to make and use the invention and is provided in the context of a patent application and its requirements. Various modifications to the disclosed embodiments and the generic principles and features described herein will be readily apparent. The disclosed embodiments are mainly described in terms of particular methods and systems provided in particular implementations. However, the methods and systems will operate effectively in other implementations. Phrases such as "disclosed embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The disclosed embodiments will also be described in the context of particular methods having certain steps. However, the method and system operate effectively for other methods having different and/or additional steps and steps in different orders that are not inconsistent with the exemplary embodiments. Thus, the disclosed embodiments are not intended to be limited to the embodiments shown, but is to be accorded the widest scope consistent with the principles and features described herein.

In general, power conversion systems for a power communications system are disclosed. The power conversion system is coupled to a power supply to supply input power over a power cable to remote radio heads (RRHs). One or more DC voltage conversion (DCVC) modules containing DC-DC converters are in respective slots in a front of an enclosure of the power conversion system. A control module coupled to the DCVC modules monitors power information to adjust an output voltage of the DC-DC converters to compensate for a voltage drop on the DC power cable. According to the disclosed embodiments, the power information may include an input voltage ($V_{IN}$) of the power input, current measurements of the input power, and a top voltage on the power cable at an input to the RRHs. The current measurements may comprise an input current ($I_{IN}$) measured on the input voltage ($V_{IN}$) of the power conversion system, and an input current ($I_{MOD}$) on an input to the DC-DC converters.

Figure 1A:
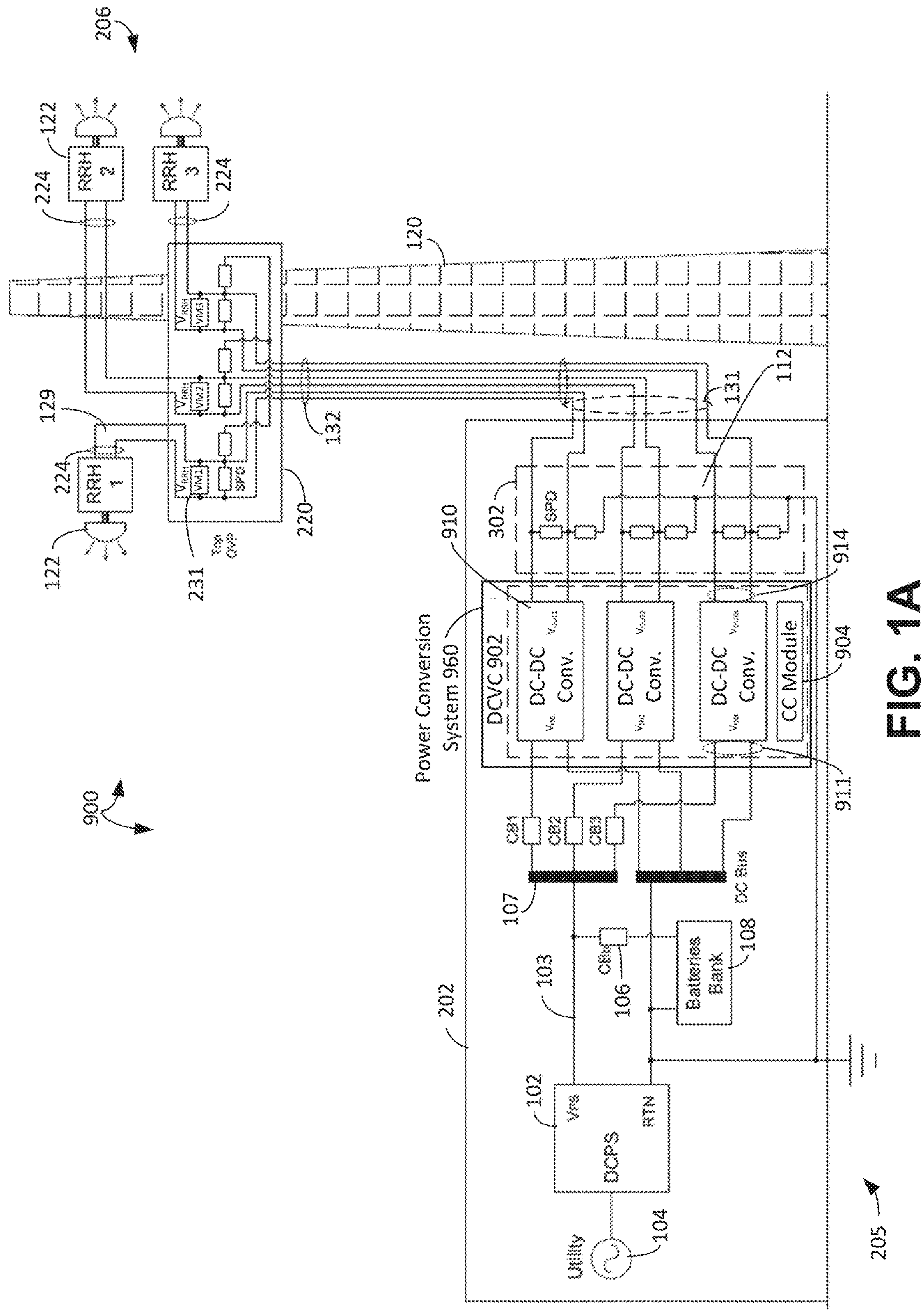
FIG. 1A-1C are block diagrams illustrating a power conversion system for a power communications system according to different embodiments.

FIG. 1A is a block diagram illustrating a power conversion system for a power communications system. The power conversion system is used for powering remote radio heads (RRHs) 122 installed on the top of a structure such as a cellular radio tower 120, as described in U.S. Pat. No. 10,812,664B2 (herein incorporated by reference). The same power transmission system also may be used for RRHs 122 located on other structures such as building rooftops. The description below refers to a base location 205 and a top location 206. Base location 205 refers to any location where a voltage control system 202 is located and connected to a base end of DC cable 132. In one example, base location 205 is at the base of cellular radio tower 120 or in a building that also contains a base band unit (BBU). Top location 206 is any location where RRHs 122 are located and connected to a second top end of DC power cables 132. In one example, top location 206 is on top of a cellular radio tower 120 or on a roof top.

The voltage control system 202 may include a DC power supply (DCPS) 102, a power conversion system 960 that is coupled to a first local end of DC power cables 132, and an overvoltage protection (OVP) assembly 302 that includes multiple surge protective devices (SPDs) 112. The DC power supply (DCPS) 102 converts AC voltage from a power utility 104 into DC voltage. The DC output of DCPS 102 is connected to a DC bus 107. The same DC bus 107 also may be connected a battery bank 108 through a circuit breaker (CB) 106. CB 106 protects against short circuit conditions and a LVD (Low Voltage Disconnect) may be included in the circuit to disconnect battery bank 108 when the voltage drops below a certain voltage level, such as −42 Vdc.

Power from DC bus 107 is distributed to several DC circuits 131 (e.g., DCC1 to DCC3) that each feed a different RRH 122 through DC cable 132. In some cases, there might be more than 3 DC circuits, for example, there may be 12 DC circuits or even more. The base overvoltage protection (OPV) unit 302 protects voltage control system 100 from lightning events using multiple surge protective devices (SPD) 112. A top OVP unit 220 is located at the top of tower 120 protects RRHs 122 from lightning events. DC power jumper cables 129 connect terminals on the top OVP unit 220 for each DC circuit 131 to corresponding RRHs 122.

DCPS 102 is installed at the base of tower 120 and provides DC voltage 103 ($V_{PS}$). DCPS 102 converts the AC voltage from power utility 104 to a DC voltage 103 of between approximately −40 Vdc and −60 Vdc. DC voltage 103 is typically set between −52 Vdc and −55 Vdc. The exact output voltage 103 is selected based on specifications for optimum charging of batteries in battery bank 108 and type of batteries used, such as lead acid, NiCAD, etc. For some applications, the optimum operating/charging voltage of batteries 108 is around −53.5 Vdc.

The optimum operating voltage of RRHs 122 is around −54 Vdc. However, RRHs 122 have an operating voltage range from −40 Vdc (in some cases down to −36 Vdc) up to −59 Vdc and in some cases can operate at up to −60 Vdc. The operating voltage for RRHs 122 can also exceed −60 Vdc for limited time periods. RRH 122 shuts down and disconnects from the input power when the input voltage drops below −40 Vdc or rises above −60 Vdc for a certain period of time, such as for more than a few seconds.

In traditional systems, a voltage 224 at the input of RRH 122 ($V_{RRH}$) will be lower than DC voltage 103 output by DCPS 102. The difference between $V_{PS}$ and $V_{RRH}$ is equal to the voltage drop on DC power cable 132, breaker, and associated DC power jumper cables 129 that connect DCPS 102 with RRH 122. The voltage drop is dependent on the current conducted on DC power cable 132 and the associated resistance of DC power cable 132 (i.e. length and cross section).

According to one embodiment, power conversion system 960 is a power conversion system for up to 12 independent DC circuits 131, with a maximum load current of approximately 50 A each, for example. The power conversion system 960 includes an input 911 that receives a power input including an input voltage ($V_{IN}$) from the DC power supply (DCPS) 102; and an output 914 (VOUT) coupled to a power cable, such as the base end of DC power cables 132.

According to the disclosed embodiments, the power conversion system 960 may comprise a DC voltage conversion (DCVC) module 902 containing one or more DC-DC converters 910, and a connectivity and control (CC) module 904 (also referred to as control module) containing a controller for the power supply and bypass circuitry. The DC-DC converters 210 scale up the output voltage from the voltage control system 202. The DC-DC converters 210 are coupled at inputs 211 ($V_{IN}$) to DC buses 107 (via breakers) and coupled at outputs 214 ($V_{OUT}$) to the base end of DC power cables 132.

One or more voltage monitoring (VM) devices 231 are installed inside of top over voltage protection (OVP) units 220 and are coupled to the top end of DC power cables 132. One or more VM devices 231 are coupled the top end of DC power cables 132 as part of DC power jumper cables 129 that connect OVP 220 to RRHs 122. VM devices 231 measure voltage 224 ($V_{RRH}$) at a top of the cellular radio tower 120 and communicate with CC module 904 coupled to DC-DC converter 910 at base location 205. The VM devices 231 transmit the measured voltages to the CC module 904 through a communication link, such as a RS485 communication link. VM devices 231 may use other types of communication links, such as optical fiber lines. In another embodiment, the VM devices may send current pulses over DC power cables 132.

The CC module 904 may be configured to monitor power information. In one embodiment, the power information may include; the input voltage (VIN), current measurements of the input voltage (VIN), a voltage measurement at an input to the RRHs 122 from VM device 231, a resistance of the DC cable 132, and a target voltage at a power input of the RRHs 122. The CC module 904 may also be configured to use at least a portion of the power information to determine a voltage drop on a DC power cables 132. The CC module signals the DCVC modules 902 to adjust their output to keep the RRH input voltage 224 stable by compensating for any voltage drop/decrease (e.g., in case the DC power input to the power conversion system 960 is from battery bank 108). This maintains the input voltage 224 at the RRHs at a relative constant level as compared to the target voltage. In one embodiment, the RRH input voltage 224 may be set to a user configurable value.

The DC-DC converters 910 are coupled to the control module 904 and are configured to generate an output voltage at the output 914 (VOUT), where the output voltage is generated by adding to the input voltage (VIN), a supplemental voltage determined from the monitored power information, to compensate for the voltage decrease on the DC cable 132 as current demand from the RRHs 122 varies. In one embodiment, the output voltage is dynamic, while in another embodiment the output voltage is static.

The CC module 904 signals DC-DC converter 910 to add voltage levels to output voltage 214 so voltage 224 at top location 206 is stable at power input of the RRH, the RRH operating voltage range between −54 Vdc to −58 VDC. Therefore, the DC-DC converter 910 adjusts its output voltage to create a stable input voltage to the RRH. DC-DC converter 910 also keeps voltage 224 below a maximum operating voltage that could cause RRH 122 to shut down. Also, during start up, if the input voltage of the DC-DC converter is below a certain threshold (say −53 Vdc), then the output voltage of the DC-DC converter could be set to −53 Vdc to ensure proper startup of the RRH in case the system runs on batteries during the start up and the voltage level of the batteries is below −50 Vdc. Voltage 224 depends on the voltage drop on DC cable 132. The voltage drop depends on the length and cross section area of DC cable 132, and also depends on a conducted current through DC cable 132, which depends on the power consumption of RRH 122. The CC module 904 calculates the resistance of DC power cable 132, estimates the voltage drop on DC power cable 132, and signals the DC-DC converter to modify output voltage 214 to compensate for the Voltage drop.

The power conversion system 960 may be implemented according to several embodiments. In a first embodiment, the DCVC module 902 may be implemented with multiple DC inputs, one or more DCVC modules containing one or more DC-DC converters 910, which may be coupled to multiple individual DC circuits 131 at the output, as shown in FIG. 1A.

Figure 1B:
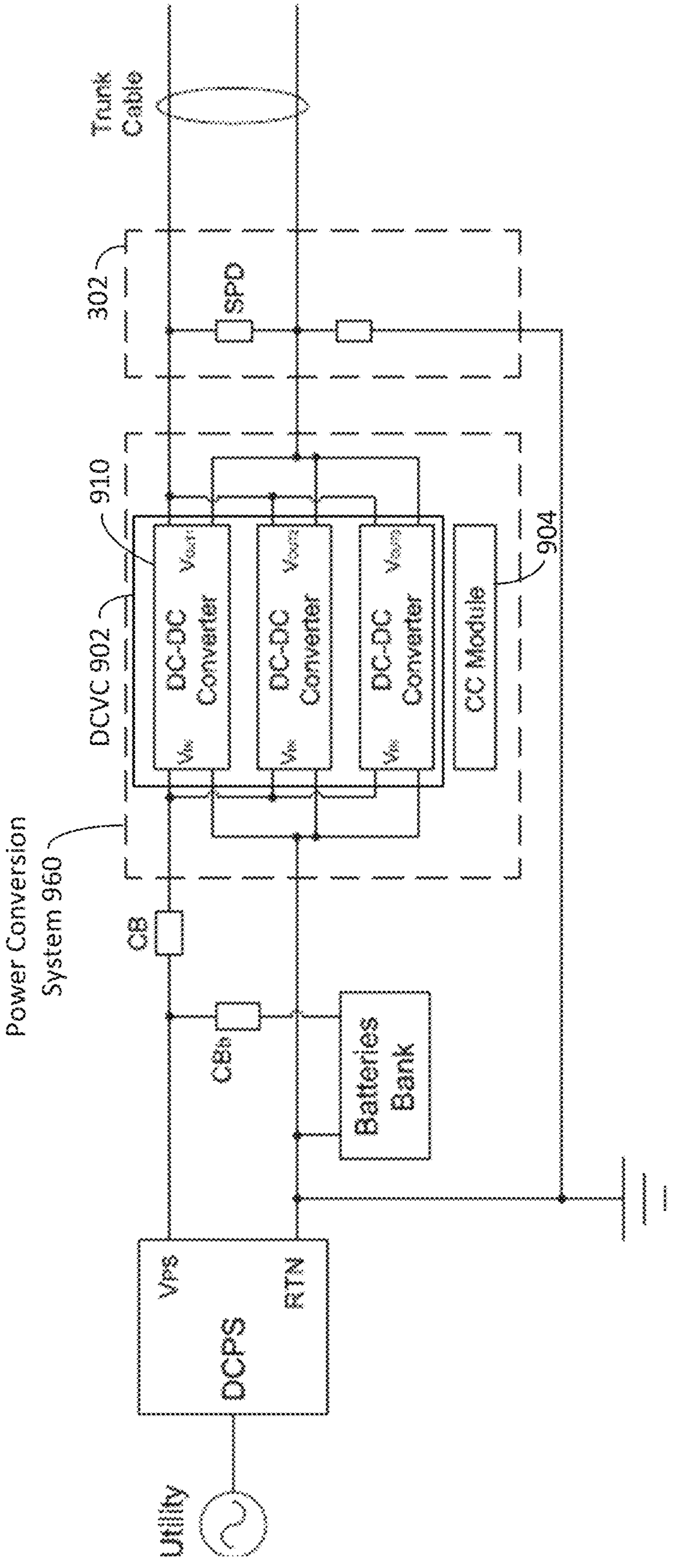

FIG. 1B shows a second embodiment where the DCVC module 902 may be implemented with a single DC input and several DCVC modules containing one or more DC-DC converters 910, which are connected in parallel at their outputs to provide one output voltage.

Figure 1C:
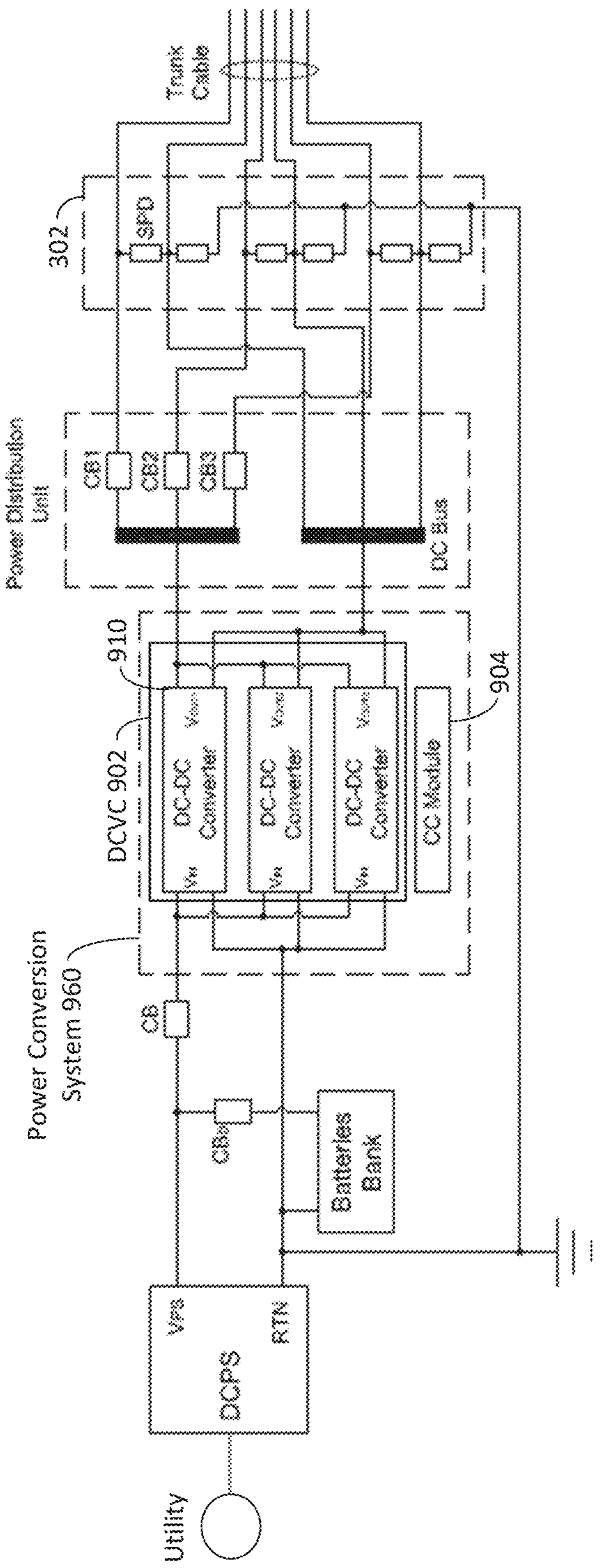

FIG. 1C shows a third embodiment where the DCVC module 902 may be implemented with a single DC input, one or more modules containing one or more DC-DC converters 910, and multiple individual DC circuits 131 at the output. FIGS. 9B and 9C show further example embodiments for the power conversion system 902. In all the above FIG. 9 embodiments, the function of the controller 948 or the controller itself may be implemented in another component, such the DCVC module 902 or a DC-DC converter 910 for example. In another embodiment, the power conversion system 960 may have a conventional Rack Unit (RU) form factor that in one embodiment is a 3 RU enclosure that can fit into a 19 inch or 23 inch rack configuration. This allows power conversion system 960 to be mounted in the same rack 262 that holds the electronic circuitry for DCPS 102 and/or holds the telecommunication circuitry for the BTS 256 shown in FIGS. 1 and 2.

Figure 2:
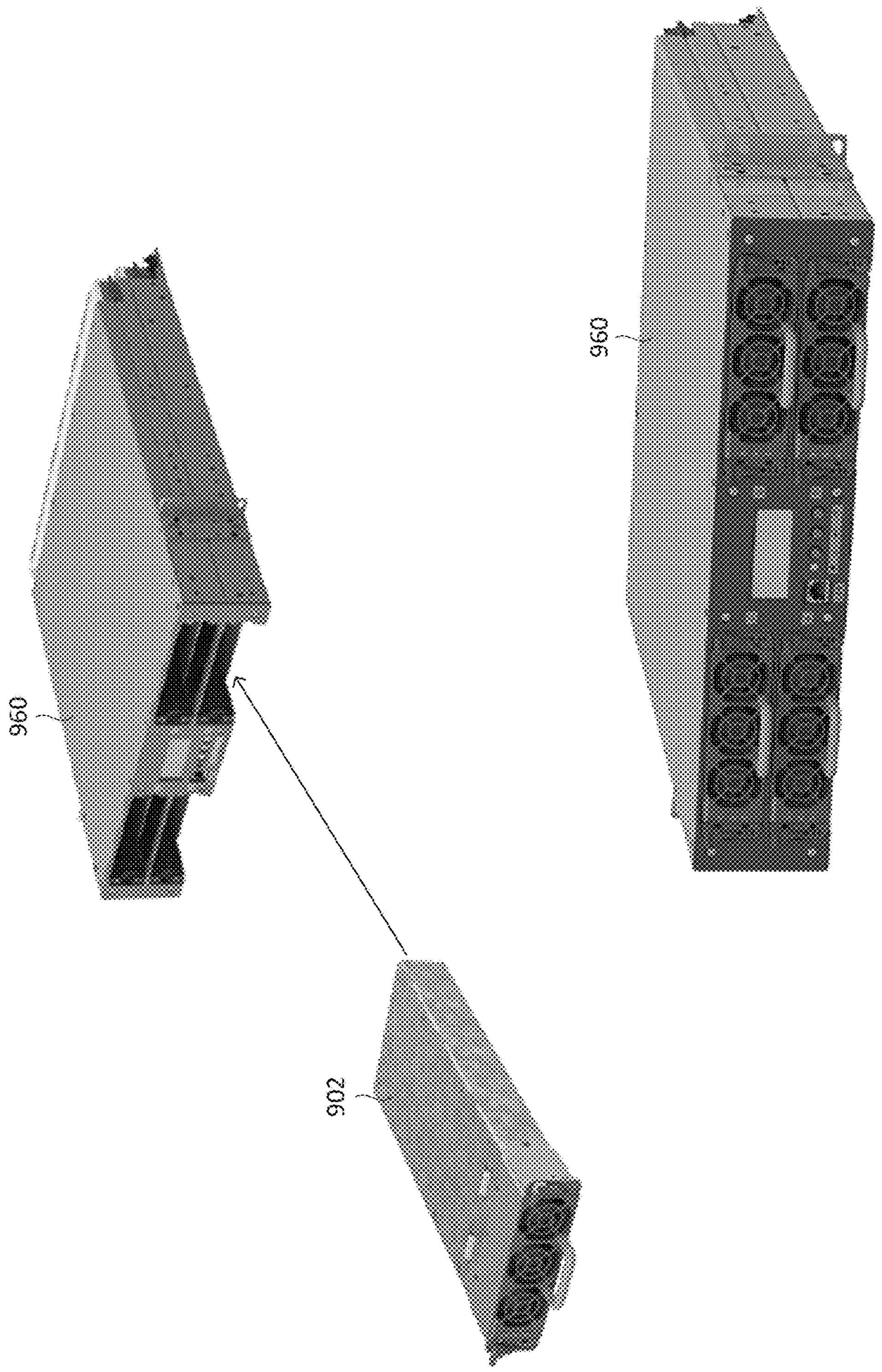
FIG. 2 is a diagram showing an example where the power conversion system is implemented in a 2 U rack (stand-alone) configuration.

FIG. 2 is a diagram showing an example where the power conversion system 960 is implemented in a 2 U rack (stand-alone) configuration. In this embodiment, the power conversion system 160 may comprise an enclosure that has slots to receive pluggable DCVC modules 902. In one embodiment, the power conversion system 960 may receive up to four DCVC modules 902, each able to service three DC circuits 131. This allows the power conversion system 960 to support a total of twelve DC circuits 131 in a single rack unit.

Figure 3A:
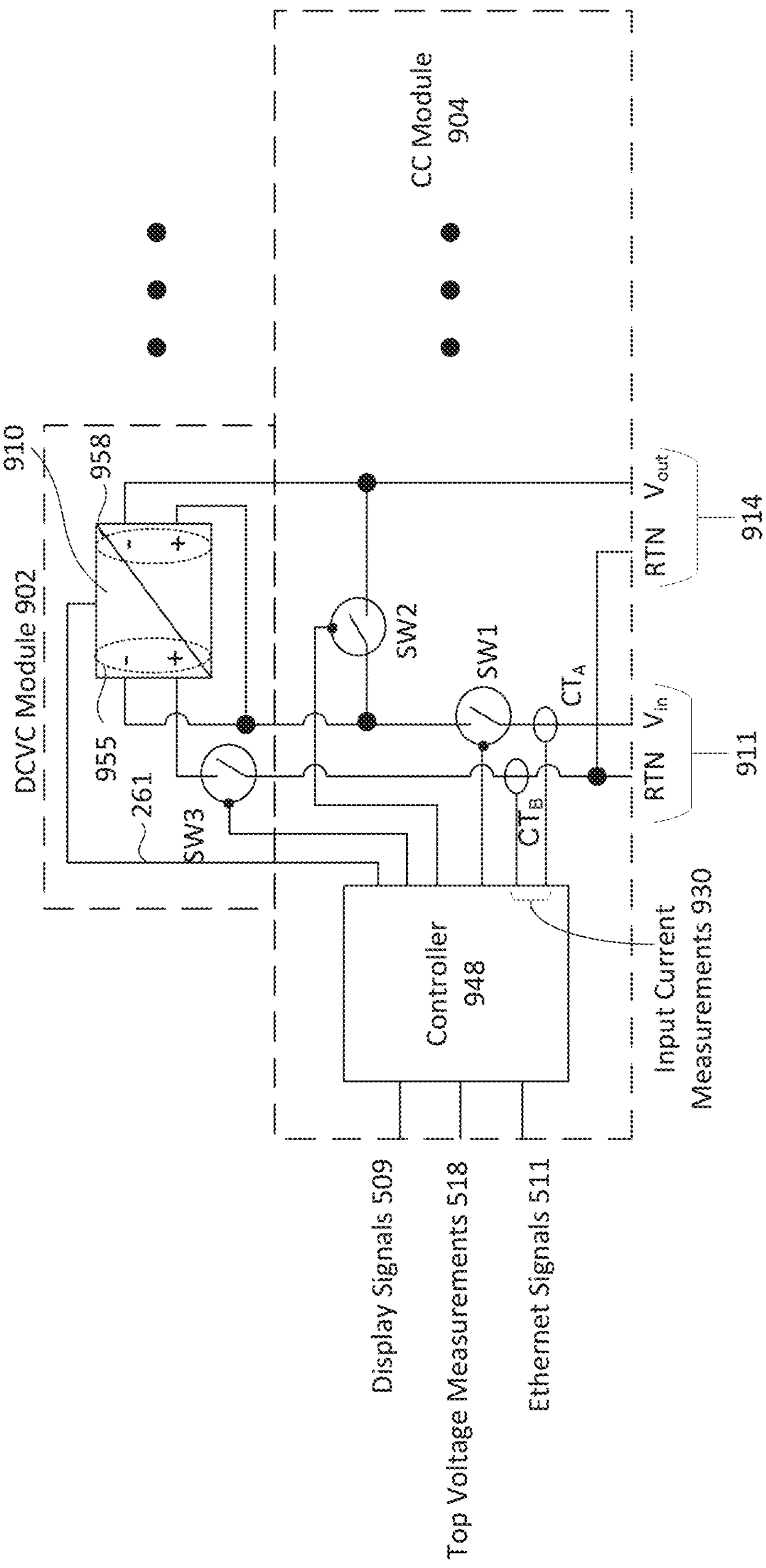
FIGS. 3A and 3B are simplified block diagrams showing connections of the DCVC module and the CC module of the power conversion system.
Figure 3B:
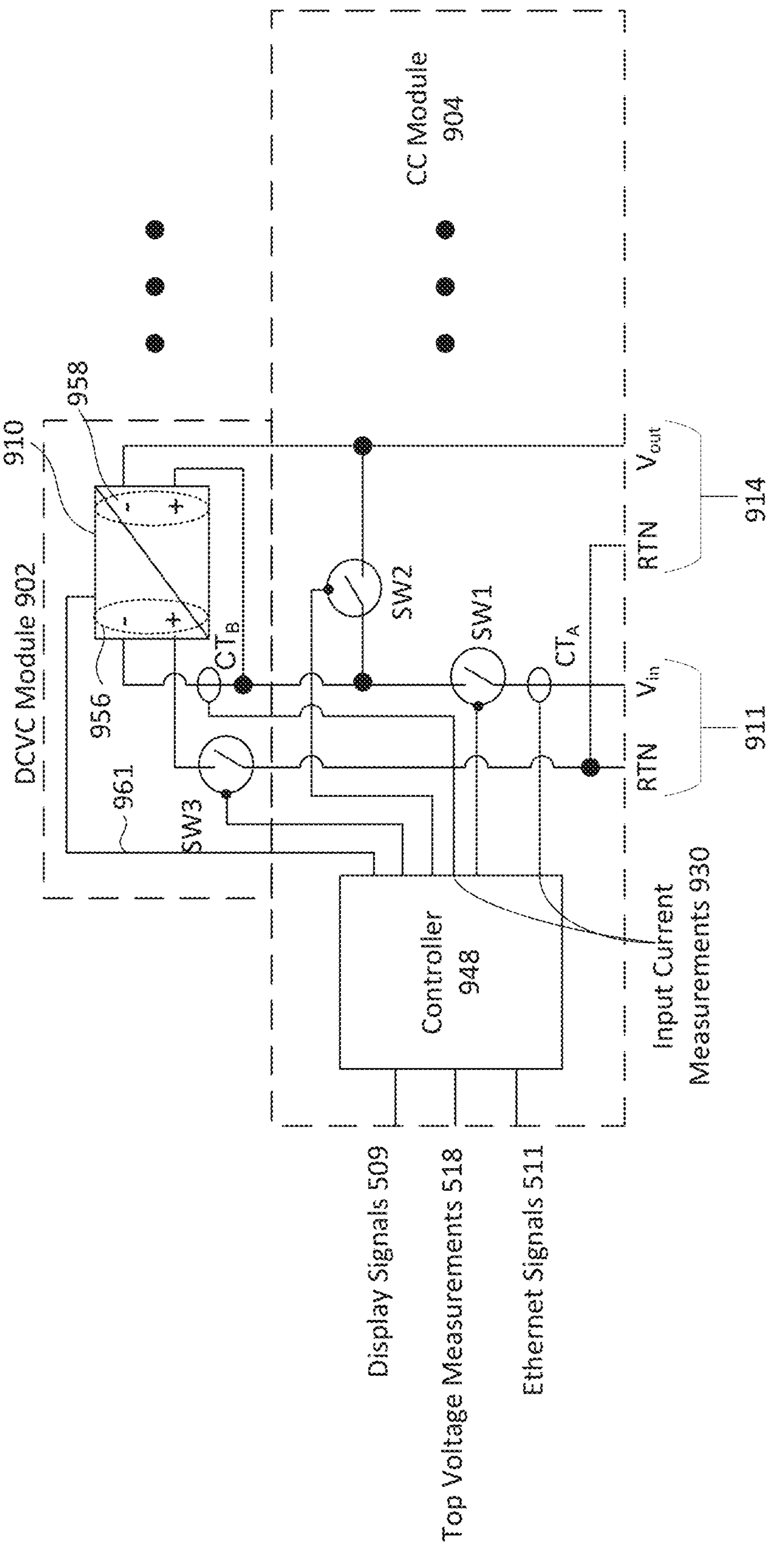

FIGS. 3A and 3B are simplified block diagrams showing connections of the DCVC module 902 and the CC module 904 of the power conversion system 960. Although only one DCVC module 902 and DC-DC converter 910 are shown as an example, it is to be appreciated that the CC module 904 may be connected to more than one DCVC module 902 having multiple DC-DC converters 210, each may be independent from the others.

The CC module 904 includes an input 911 that receives input power on input on DC bus 107 from DCPS 102 (FIG. 1A). The input power includes input voltage ($V_{IN}$) that may vary from approximately −39 Vdc up to −58 Vdc. The input power is passed to the DC-DC converter 910 via voltage input 955. The DC-DC converter 910 generates an output voltage 958 that is a fixed or variable, which is passed through the CC module 904 as output 914 ($V_{OUT}$) to the top OVP unit 220. For example, the DC-DC converter 910 may generate output voltages 958 of −54 VDC up to −74 Vdc.

In the FIG. 3A embodiment, the DC-DC converters 910 of the DCVC module 902 convert a portion of the input power to a configured voltage level (e.g., 0-24V). The output voltage of the power conversion system 960 is the input voltage plus an output voltage of the DC-DC converters 910. Thus, the power conversion system 960 does not convert the full power of the input power, only a fraction of the input power. In another embodiment, the DCVC module 902 may be implemented as a full-scale system where the DC-DC converters 910 convert all of the input power to the output voltage of the power conversion system 960 but at a different voltage level.

In traditional systems, a voltage 224 at the input of RRH 122 ($V_{RRH}$) will be lower than DC voltage ($V_{PS}$) 103 output by DCPS 102. The difference between $V_{PS}$ and $V_{RRH}$ is equal to the voltage drop on DC power cable 132, breaker, and associated DC power jumper cables 129 that connect DCPS 102 with RRH 122. The voltage drop is dependent on the current conducted on DC power cable 132 and the associated resistance of DC power cable 132 (i.e. length and cross section).

To compensate for the voltage drop, the control module 904 may include a controller 948 that is configured to monitor power information, including any combination of: input power, input voltage (VIN), current measurements of the input power, a voltage at an input to the RRHs 122 (e.g. measured from VM 231), a resistance of the DC cable 132, and a target voltage at a power input of the RRHs 122. For example, initial measurements are taken for the voltage at the tower end of the DC cable, the voltage at the base of the tower, and the current through the DC cable, which is estimated based on the input current measurements. In one embodiment, current sensors may be used to obtain the input current measurements of the input power. $CT_A$ is used to measure a total input current ($I_{IN}$) of the input power to the control module 904, and $CT_B$ is used to measure the input current ($I_{MOD}$) of the power input to the DC-DC converter 910.

The CC module 904 may continue power supply to the RRHs 122 in case the DC-DC converter 910 fails or is unplugged, causing the system to operate in by-pass mode for each DC circuit 131 independently, where input voltage 911 is transferred to the output voltage 914. Each of the DCVC modules 902 can be plugged or unplugged when the system is in operation without disconnecting the power transmission to the RRHs 122.

By-pass circuitry comprising switches (SW1, SW2, SW3) connect the input voltage to the output of the power conversion system 960, neutralizing the power DC-DC converter(s) 910. This offers continuous power supply to RRHs 122 in case of any failure on the DC-DC converter(s). The switches are coupled to the controller 948 for each DC circuit 131 that transfer the input voltage to the output voltage. SW2 by-passes the DC-DC converter 910 in case the DC-DC converter 910 has failed or the DCVC module 902 is unplugged. The CC module 904 may have a current limit function. When the output voltage exceeds a certain threshold for a period of time, the CC module 904 uses SW1 to disconnect the input voltage from the power supply for each DC circuit 131, and then uses SW2 to connect the input voltage to the output to maintain power to the RRH. The CC module 904 may also have protection against reverse polarity, so when the input voltage is connected in reverse polarity, SW1 and SW3 are used to disconnect the system. SW1 interrupts the input voltage 911 in case of overcurrent conditions at the output.

The CC module 904 may communicate to a user through a display (not shown) using display signals 509 that provide/display information on settings and status and the alarms of the system and to receive settings information. Settings may include a target top voltage for each DC circuit, current limit thresholds, and the like.

According to the disclosed embodiments, once the resistance is calculated, only the input current measurements are used to estimate the RRH input voltage. The controller 948 of the CC module 904 selectivity activates the DCVC module 902 to adjust output voltage 958 to compensate for the voltage drop by sending voltage control signal 961 to DC-DC converter 910, as described in FIG. 4.

Figure 4:
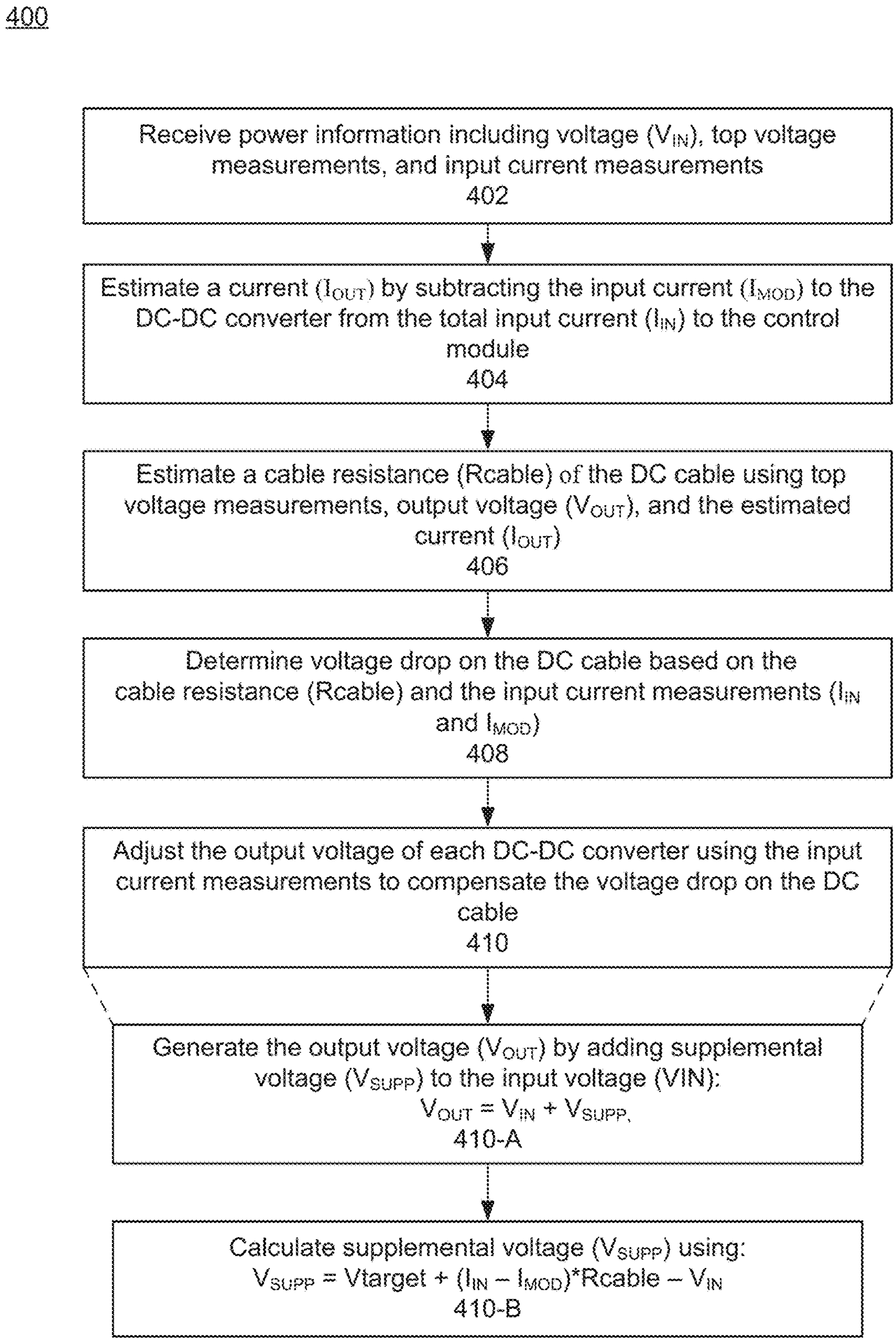
FIG. 4 is a flow diagram illustrating a process performed by CC module through controller to generate a dynamic output voltage.

FIG. 4 is a flow diagram illustrating a process 1100 performed by CC module 904 through controller 948. The controller 948 uses an input current ($I_{MOD}$) of the power input to the DCVC module 902 to generate a dynamic output voltage at output 914. Referring to FIGS. 3A-3B and 4, the process may begin with the control module 904 receiving input power from a power supply and power information, where the power information may include: an input voltage ($V_{IN}$) from the input power, top voltage measurements 518 (e.g., measured by VM 231 in top OVP unit 220), and input current measurements 930 measured by one or more current sensors (CT) (block 402). In one embodiment, two current sensors are used: $CT_A$ is used to measure a total input current ($I_{IN}$) of the input power to the control module 904, and $CT_B$ is used to measure the input current ($I_{MOD}$) of the power input to the DC-DC converter 910 (using the implementation shown in FIG. 3A or 3B).

Then CC module 904 first estimates a current ($I_{OUT}$) of the power conversion system by subtracting the input current ($I_{MOD}$) to the DC-DC converter 910 from the input current ($I_{IN}$) to the control module 904 (block 404). Note that this is not an accurate estimation of the output current, as there are also additional losses on the DCVC module 902 that may reduce the value of the output current further. In any case, the expected accuracy is within the requirements of the operation of the system. In a further embodiment, a more accurate estimation may be determined by estimating any further output current decrease by estimating the losses on DCVC module 902 based on DCVC module 902 efficiency at a given output voltage and a given input current. However, this embodiment may introduce further complexity and delays on the estimation of the current.

The controller 948 may initially estimate a cable resistance (Rcable) of the DC cable 132 using the top voltage measurements 518, the output voltage ($V_{OUT}$) of the power conversion system, and the estimated current ($I_{OUT}$) of the power conversion system (block 406). The estimation of the cable resistance may be performed by dividing a difference between the top voltage measurements 518 and the output voltage ($V_{OUT}$) by the estimated current ($I_{OUT}$). Because the transmission rate of the top voltage measurement may not be sufficient, the controller 948 may require accumulated top voltage measurement information and repeat this process multiple times to achieve a sufficiently accurate estimate of the cable resistance. The controller may adjust the estimated resistance value during operation by repeating the above process.

The output voltage ($V_{OUT}$) of the DC-DC converter could be adjusted to compensate for the voltage drop on the DC power cable using the top voltage measurements 518 and the output voltage of the power conversion system. However, the top voltage measurement may not suitable for frequent adjustment of the output voltage because the transmission rate of the top voltage measurement may not be sufficient for an accurate estimation of the voltage drop on the DC cable.

Therefore, according to the disclosed embodiments, the voltage drop on the DC cable is determined based on the cable resistance (Rcable) and the input current measurements ($I_{IN}$ and $I_{MOD}$) on the DC power cable (block 408). Then, the output voltage of the DC-DC converter 910 is adjusted to compensate for the voltage drop of the DC power cable using the estimated resistance of the DC power cable and the input current measurements ($I_{IN}$ and $I_{MOD}$), rather than the top voltage measurements (block 410). More specifically, the controller 948 adjusts the output voltage 958 ($V_{OUT}$) of DC-DC converter 910 by adding to the input voltage ($V_{IN}$), a supplemental voltage ($V_{SUPP}$) using the formula (block 410-A):

$$V_{OUT} = V_{IN} + V_{SUPP},$$

where the supplemental voltage ($V_{SUPP}$) is calculated from monitored power information including the input voltage ($V_{IN}$), the input current measurements ($I_{IN}$ and $I_{MOD}$), the cable resistance (Rcable), and a target voltage (Vtarget) at a power input of the RRHs 122. In one embodiment, the controller may determine $V_{SUPP}$ using the formula (block 410-B):

$$V_{SUPP} = Vtarget + (I_{IN} - I_{MOD}) * Rcable - V_{IN}.$$

In embodiments, the CC module 904 continually estimates the voltage drop on the DC cable for each DC circuit 131, through the input current measurements 930 and the estimated resistance of the circuit. The reason that the CC module 904 varies its output using the input current measurements 930, rather than the top voltage measurements 518, is to achieve a higher rate of output voltage variation in case where the top voltage measurements 518 are transmitted to the base at too slow a rate that makes the CC module 904 output unstable.

After the controller 948 determines what supplemental voltage ($V_{SUPP}$) should added to the output voltage 958 of each DC-DC converter 910 in order to compensate the voltage drop on the DC cable for each DC circuit 131, the controller 948 sends a value of the supplemental voltage to the DC-DC converter 910 via voltage control signal 961 to adjust the output voltage accordingly. The controller may also compare the estimated voltage at the power input of the RRH with the measured voltage values (top voltage measurements) and adjust the estimated values of the DC cable resistance during operation (by repeating the process described for the resistance estimation). The estimated voltage at the power input of the RRH is the sum of the output voltage of the DC-DC converter and the estimated voltage drop on the power cable. This will enable the controller to capture any deviation on the actual resistance of the power cable that takes place for any reason.

In other embodiments, in addition to using input current measurements 930, the top voltage measurements 158 can be used to estimate the output voltage 958 of each DC-DC converter 910.

In another embodiment where a full-scale converter is used, the controller 948 may determine the cable resistance by calculating the resistance of each DC circuit 131 based on the top voltage measurements 518, the input current measurements 930, the input voltage measurements and the output voltage 958 of the DC-DC converter 910 at the base. Using the input voltage and current measurements as well as the output voltage measurement the output current ($I_{OUT}$) can be estimated, which is required to estimate the DC cable resistance, under the assumption that the power losses through the DC-DC converter are zero or at a typical value of 2-5%. However, this technique requires more measurements and complicated procedure to determine the DC cable resistance.

In yet another embodiment, however, the controller 948 may determine the cable resistance by receiving resistance information that is input by the user. In all embodiments, the resistance can also be updated during the operation of the system in case the resistance changed.

There are cases where the DC power system feeding the power conversion system runs on batteries only (when utility power outage occurs). In such cases, a value of the input voltage ($V_{IN}$) may be reduced due to the usage of the battery. In response, the controller 948 may increase further the output voltage ($V_{OUT}$) to compensate for the reduced input voltage in addition to the voltage drop on the DC power cable. In such cases, the supplemented voltage ($V_{SUPP}$) equals to the voltage drop due to the battery use and the voltage drop on the DC power cable.

A power conversion system has been disclosed. The present invention has been described in accordance with the embodiments shown, and there could be variations to the embodiments, and any variations would be within the spirit and scope of the present invention. Accordingly, many modifications may be made by one of ordinary skill in the art without departing from the spirit and scope of the appended claims.

What is claimed is:

1. A power conversion system coupled to a power supply that supplies power over a power cable connected to remote radio heads (RRHs), the power conversion system comprising:

an input that receives input power including an input voltage (VIN) from the power supply, and an output coupled to the power cable;

one or more DC-DC converters coupled to the output and configured to generate an output voltage at the output, the output voltage generated by adding to the input voltage (VIN), a supplemental voltage (VSUPP) determined from monitored power information to compensate for a voltage decrease on the power cable; and a control module configured to monitor the power information, the power information including input current measurements of the input power, the input current measurements comprising an input current (IIN) measured on an input of the power conversion system and an input current (IMOD) measured on an input to the one or more DC-DC converters, and a resistance of the power cable;

wherein the supplemental voltage (VSUPP) is calculated using the power information including the input voltage (VIN), the input current measurements (IIN and IMOD), the resistance of the power cable (Rcable), and a target voltage (Vtarget) at a power input of the RRHs:

$$V_{SUPP} = Vtarget + (I_{IN} - I_{MOD}) * Rcable - V_{IN}.$$

2. The power conversion system of claim 1, wherein the power information further includes a top voltage at an input to the RRHs.

3. The power conversion system of claim 2, wherein the control module is further configured to use at least a portion of the power information determine a voltage drop on a DC cables and to signal the one or more DC-DC converters to adjust the output voltage of the one or more DC-DC converters to compensate for any input voltage decrease to maintain the input voltage at the RRHs at a relative constant level.

4. The power conversion system of claim 2, wherein the resistance of the power cable is determined by calculating a resistance of each DC circuit in the power cable based on the top voltage at the RRHs, the current measurements of the input power, and the output voltage.

5. The power conversion system of claim 4, further comprising: wherein the resistance of the power cable is determined by receiving resistance information that is input by a user.

6. The power conversion system of claim 1, further comprising an enclosure that has slots to receive at least one pluggable module containing the one or more of one or more DC-DC converters.

7. A power conversion system, comprising:

a DC-DC converter configured to receive a power input including an input voltage (VIN) from a power supply and generate an output voltage (VOUT) on a DC cable to power at least one remote radio head (RRH);

a control module configured to:

i) estimate a cable resistance (Rcable) of the DC cable based on power information, the power information including: the output voltage (VOUT), a top voltage on the DC cable at the RRHs, input current measurements of the power input, the input current measurements comprising an input current (IIN) measured on an input of the power conversion system, and an input current (IMOD) measured on an input to the DC-DC converter;

ii) determine a voltage drop on the DC cable based on the cable resistance (Rcable) and the input current measurements (IIN and IMOD); and iii) adjust the output voltage (VOUT) of the DC-DC converter by adding to the input voltage (VIN), a supplemental voltage (VSUPP) so that the output voltage (VOUT) compensates for the voltage drop:

$$V_{OUT} = V_{IN} + V_{SUPP}.$$

8. The power conversion system of claim 7, wherein the estimation of the cable resistance is performed by dividing a difference between the top voltage measurements and the base output voltage (VOUT) by the estimated current (IOUT).

9. The power conversion system of claim 7, further comprising calculating the supplemental voltage (VSUPP) using the power information including the input voltage (VIN), the input current measurements (IIN and IMOD), the cable resistance (Rcable), and a target voltage (Vtarget) at a power input of the RRHs:

$$V_{SUPP} = Vtarget + (I_{IN} - I_{MOD}) * Rcable - V_{IN}.$$

10. The power conversion system of claim 9, wherein the control module first estimates a current (IOUT) of the power conversion system by subtracting the input current (IMOD) to the DC-DC converter from the input current (IIN) of the DC-DC converter.

11. The power conversion system of claim 9, wherein a value of the input voltage (VIN) is reduced due to usage of a battery, the control module further configured to: increase the output voltage (VOUT) to compensate for the reduced input voltage in addition to the voltage drop on the DC cable.

12. The power conversion system of claim 11, wherein the supplemental voltage (VSUPP) equals the reduced voltage drop due to the battery and the voltage drop on the DC power cable.

13. The power conversion system of claim 1, wherein the power conversion system is implemented in a 2U rack configuration.

* * * * *